UNITED STATES PATENT OFFICE.

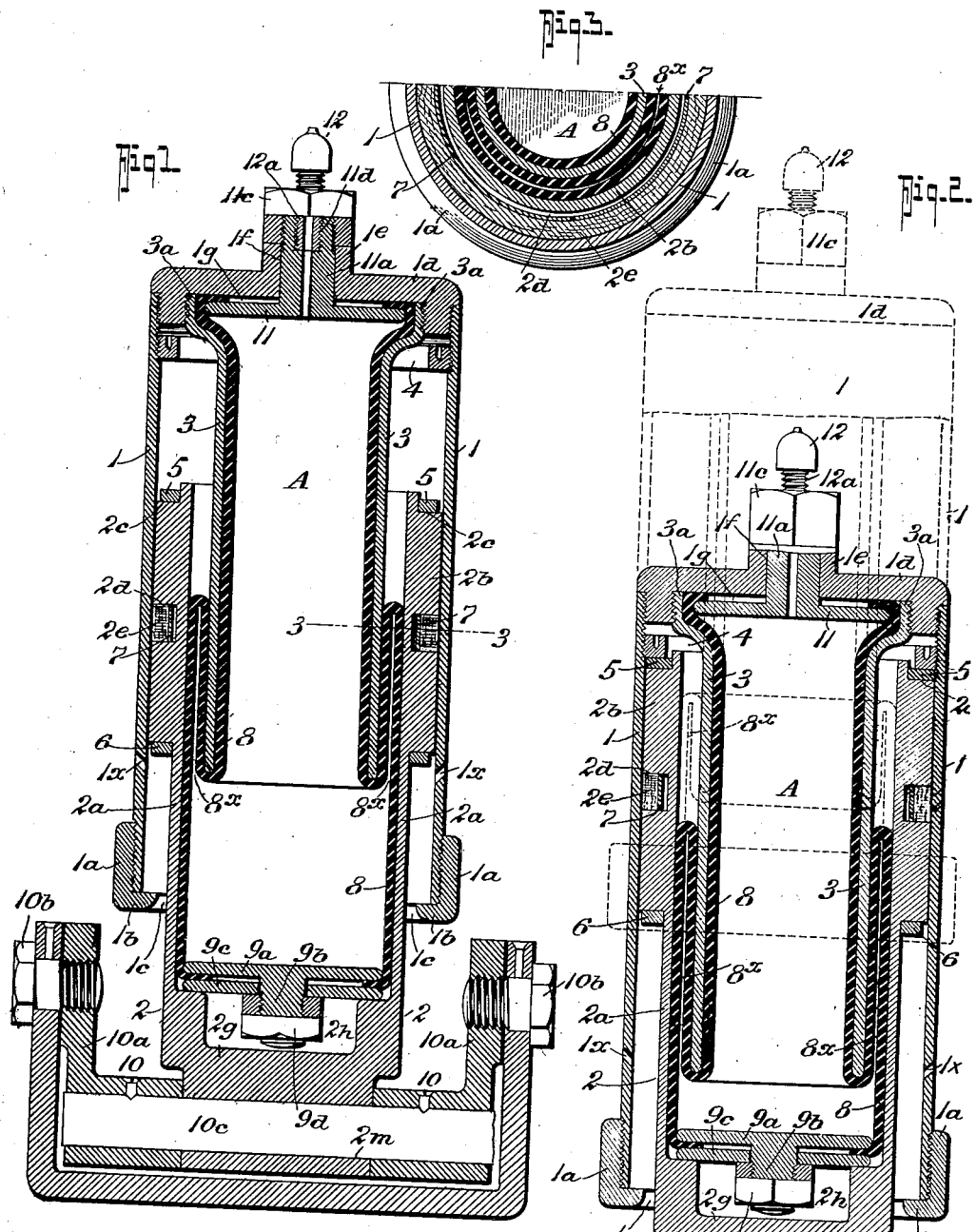

JAMES H. CLARK, OF RICHMOND, VIRGINIA, ASSIGNOR OF ONE-HALF TO FRANK M. THOMPSON, OF RICHMOND, VIRGINIA.

PNEUMATIC SUSPENSION MEANS.

No. 894,117.      Specification of Letters Patent.      Patented July 21, 1908.

Application filed June 24, 1907. Serial No. 380,548.

*To all whom it may concern:*

Be it known that I, JAMES H. CLARK, residing at Richmond, in the county of Henrico and State of Virginia, have invented certain new and useful Improvements in Pneumatic Suspension Means, of which the following is a specification.

My invention relates to certain new and useful improvements in pneumatic suspension means, and it particularly relates to such means as are particularly adapted for use in connection with automobiles, motor vehicles, bicycles and the like, and serve the function of a shock absorber.

In its generic nature the invention embodies a pair of telescopic cylinders, one of which carries a piston operable in the other cylinder, and a flexible air-tight tube held within the piston and telescopic cylinders to form a compression chamber.

The invention primarily has for its object to provide a device of the foregoing character of a very simple and effective construction which can be easily and cheaply manufactured and which will readily serve its intended purposes, and with other objects in view than have been heretofore specified, the invention also comprises certain novel details of construction, combination and arrangement of parts, all of which will be first fully described, then specifically pointed out in the appended claims and illustrated in the accompanying drawings, in which, Figure 1, is a central vertical longitudinal section of my invention showing the position of the parts when in their normal position. Fig. 2, is a similar view showing the position of the parts when telescoped to their maximum distance in full lines, and showing the position of the parts when extended to their maximum distance in dotted lines. Fig. 3, is a cross section on the line 3—3 of Fig. 1. Fig. 4, is a detail view of a portion of the airtight tube forming a part of my invention.

Referring now to the accompanying drawings in which like letters and numerals of reference indicate like parts in all of the figures 1 designates the main telescopic cylinder whose lower end is provided with a collar $1^a$ having a flange $1^b$ whose central aperture $1^c$ is of slightly greater diameter than the external diameter of the tubular part $2^a$ of the second telescopic member 2, and of less diameter than that of the outer cylinder or telescopic member 1. The upper end of the cylinder 1 is closed by a threaded cap $1^d$ which has a hub $1^e$ provided with a central bore $1^f$ for a purpose presently explained, and the cap $1^e$ also has an internal threaded pocket $1^g$ to receive the threaded flange $3^a$ of the piston cylinder 3, which projects into the telescopic member 2 as clearly shown in Fig. 1, of the drawings.

In order to form a stop to limit the telescoping movement of the cylinders 1 and 2, and to prevent contact between the end of the cylinder 2 and the cap $1^d$, I provide a stop ring 4, threaded within the upper end of the cylinder 1 and spaced below the cap $1^d$, as shown in Fig. 1, of the drawings, and this ring 4 coöperates with a lock or other suitable flexible bumper or washer 5, held within the circumferential groove $2^c$ of the piston head $2^b$ of the inner telescopic member 2, while a second bumper or washer 6 is placed on the telescopic member 2 to coöperate with the flange $1^b$ of the ring $1^a$ to limit the extending movement of the telescopic sections and relieve the impact between the telescopic members 1 and 2 when in the position shown in dotted lines in Fig. 2.

The piston portion $2^b$ of the telescopic member 2 is provided with a circumferential pocket $2^d$ to receive the lubricating wick $2^e$ which is normally pressed against the inner walls of the cylinder 1 by the leaf spring 7, the cylinder 1 having oiling apertures $1^x$ through which oil may be admitted to the wick $2^e$ when the telescopic members are in their extended position, shown in dotted lines in Fig. 2.

The cylinder 1 may be secured to the vehicle in any approved manner, as may be also the cylinder 2, and a detailed illustration thereof is thought to be unnecessary. I may state, however, that the cylinder 1 may be relatively fixedly secured to some stationary part of the vehicle body while the cylinder 2 may be mounted, as shown in the drawings, to a bracket member 10 in a manner which will be presently again referred to.

The cylinder 2, it will be noticed, has its telescoping end open and its opposite end closed by a head $2^g$, and counterbore to form a chamber $2^h$ for a purpose presently explained.

Within the cylinder 2 and the piston 3, whose lower end is open, I place a flexible rubber fabric tube 8, shown in detail in Fig. 4, which tube 8 is composed of fabric rubbercoated to render the same air-tight and has its ends open. One end of the tube 8 is closed by a disk $9^a$ on a stem $9^b$ and a second washer or disk $9^c$ that is held against the disk $9^a$ by a nut $9^d$ threaded on the stem $9^b$, as shown, the ends of the tube being clamped between the disks $9^a$ and $9^c$.

In practice, the stem $9^b$ and nut $9^d$ rests in the supplemental chamber or pocket $2^h$ of the section 2. The flexible tube 8 has its other end clamped to the head $1^d$, being interposed near the inner surfaces of the head and the disk 11 whose stem $11^a$ projects through the hub $1^e$ of the head $1^d$ and is secured in place by a nut $11^c$. The stem $11^a$ is longitudinally apertured and countersunk as at $11^d$ to receive the stem $12^a$ of the valve 12 by means of which air, under pressure, may be admitted to the chamber A, formed within the expansible fabric tube 8 to hold the telescopic sections in their normal positions.

It will be noticed from the drawings, that the flexible fabric tube 8 is of greater length than the length of the chamber A when the telescopic members are extended to the greatest distance, as shown in dotted lines in Fig. 2, and the tube 8 is doubled back between the piston 3 and the piston portion $2^b$ of the telescopic member 2, the outer diameter of the piston 3 and the diameter of the bore of the telescopic member 2 being such as to leave a space $8^\times$ between the folds of the tube 8 and thus prevent frictional contact therebetween.

While any desired method of mounting the telescopic sections to the vehicle may be employed, I have shown a means for mounting the section 2 to a bracket support 10 and this means consists in providing the cranks $10^a$ which are fulcrumed by the bolts $10^b$ to the bracket 10 and which carry the short shaft or axle section $10^c$ which passes through an aperture $2^m$ in the head $2^g$ of the telescopic section 2, as shown, and in practice, the bracket 10 may be secured to the running gear of the vehicle, while the telescopic section may be secured to the body of the vehicle. This allows of a slight swing on the fulcrums $10^b$ and the shaft section $10^c$ and thus adds to the resiliency of the telescopic sections and assists in absorbing the shock when going over rough roads.

In order to replace the tube 8 should the same become punctured or worn, it is only necessary to unscrew the cap $1^d$ and withdraw the parts attached thereto, making it unnecessary to disconnect the telescopic sections from one another or from the vehicle body and running gear.

In practice, compressed air is admitted to the chamber A to the extent of about 100 pounds, per square inch, such amount, depending upon the weight of the vehicle body, being only sufficient to position the telescopic sections as shown in Fig. 1, so as to allow of the proper movement, either to telescope the sections or extend the same, as conditions may require.

From the foregoing description taken in connection with the accompanying drawings it is thought the complete construction, operation and numerous advantages of my invention will be readily understood by those skilled in the art to which the invention appertains.

What I claim is:—

1. In an apparatus of the character stated, a pair of telescopic cylinders, a piston cylinder carried within one of said telescopic cylinders and projecting into the other cylinder, and an air tight flexible tube held within said piston cylinder and the inner telescopic cylinder, substantially as shown and described.

2. In an apparatus of the character stated, a pair of telescopic cylinders, a piston cylinder carried within one of said telescopic cylinders and projecting into the other cylinder, an air tight flexible tube held within said piston cylinder and the inner telescopic cylinder, a closure cap secured to one of said telescopic cylinders, and said piston cylinder, said piston cylinder having its other end open, substantially as shown and described.

3. The combination with an inner and an outer telescopic cylinder, of a cylindrical piston secured within the outer telescopic cylinder and projecting into the inner telescopic cylinder and spaced therefrom, of a flexible air tight tube secured at one end to the end of the piston cylinder opposite the inner telescopic end and projected into the inner telescopic cylinder substantially as shown and described.

4. The combination with an inner and an outer telescopic cylinder, of a cylindrical piston secured within the outer telescopic cylinder and projecting into the inner telescopic cylinder and spaced therefrom, of a flexible air tube secured at one end within said piston cylinder and projecting through said piston cylinder into said inner telescopic cylinder and loosely held therein, substantially as shown and described.

5. The combination with an inner and an outer telescopic cylinder and a piston carried within the outer cylinder and telescoping within the inner cylinder, said inner cylinder having a piston head provided with an annular groove and lubricating devices held in said groove, said outer cylinder having limiting stops for coöperating with the inner cylinder piston head, and a flexible pneumatic tube held within the cylinder and within the piston.

6. The combination with an inner and an outer telescopic cylinder and a piston carried within the outer cylinder and telescoping within the inner cylinder, said inner cylinder having a piston head provided with an annular groove and lubricating devices held in said groove, said outer cylinder having limiting stops for coöperating with the inner cylinder piston head, a flexible pneumatic tube held within the inner cylinder and within the piston, and means for admitting air into said tube.

7. The combination with an inner and an outer telescopic cylinder, the inner telescopic cylinder having a piston head provided with an annular groove and lubricating devices held in said groove, said outer telescopic cylinder having limiting stops for coöperating with said inner telescopic cylinder piston head, a flexible pneumatic tube held within said cylinders, means for admitting air into said tube, a closure cap for said outer telescopic cylinder, and means for securing said flexible tube at one end to said closure cap, substantially as shown and described.

8. The combination with an inner and an outer telescopic cylinder, the inner telescopic cylinder having a piston head provided with an annular groove, and lubricating devices held in said groove, said outer telescopic cylinder having limiting stops for coöperating with said inner telescopic cylinder piston head, a flexible pneumatic tube held within said cylinders, means for admitting air into said tube, a closure cap for said outer telescopic cylinder, means for securing said flexible tube at one end to said closure cap, and means for pivotally connecting one of said telescopic tubes to the running gear of a vehicle, substantially as shown and described.

9. The combination with an inner and an outer telescopic cylinder, said inner telescopic cylinder having one end closed and one end open, the open end projecting into the outer telescopic cylinder, the outer telescopic cylinder having its telescoping end open, a closure cap for the other end of said outer telescopic cylinder, limiting stops carried by said outer telescopic cylinder for coöperatively engaging a portion of the inner telescopic cylinder, a flexible air tube secured at one end to said closure cap and loosely projected into the inner telescopic cylinder, substantially as shown and described.

10. The combination with an inner and an outer telescopic cylinder, said inner telescopic cylinder having one end closed and one end open, the open end projecting into the outer telescopic cylinder, the outer telescopic cylinder having its telescoping end open, a closure cap for the other end of said outer telescopic cylinder, limiting stops carried by said outer telescopic cylinder for coöperatively engaging a portion of the inner telescopic cylinder, a flexible air tube secured at one end to said closure cap and loosely projected into the inner telescopic cylinder, a tubular piston secured at one end to said closure cap and surrounding said flexible tube and projecting into said inner telescopic cylinder, substantially as shown and described.

11. The combination with an inner and an outer telescopic cylinder, said inner telescopic cylinder having one end closed and one end open, the open end projecting into the outer telescopic cylinder, the outer telescopic cylinder having its telescoping end open, a closure cap for the other end of said outer telescopic cylinder, limiting stops carried by said outer telescopic cylinder for coöperatively engaging a portion of the inner telescopic cylinder, a flexible air tube secured at one end to said closure cap and loosely projected into the inner telescopic cylinder, a tubular piston secured at one end to said closure cap and surrounding said flexible tube and projecting into said inner telescopic cylinder, and means for yieldingly mounting one of said cylinders to the running gear of the vehicle, substantially as shown and described.

12. The combination with an inner telescopic cylinder closed at one end and open at the other end, of an outer telescopic cylinder having one end open, a closure cap for the other end of said outer telescopic cylinder, said inner telescopic cylinder having a piston head, bumpers carried by said piston head, stops carried by said outer telescopic cylinder for coöperating with said bumpers, a piston cylinder secured to said closure cap and projecting into said inner telescopic cylinder and spaced therefrom, an open ended flexible air tube held within said piston cylinder, and said inner telescopic cylinder, means forming a closure for one end of said air tube for clamping it to the closure cap of the outer telescopic cylinder, and closure means for the other end of said air tube, substantially as shown and described.

13. The combination with an inner telescopic cylinder closed at one end and open at the other end, of an outer telescopic cylinder having one end open, a closure cap for the other end of said outer telescopic cylinder, said inner telescopic cylinder having a piston head, bumpers carried by said piston head, stops carried by said outer telescopic cylinder for coöperating with said bumpers, a piston cylinder secured to said closure cap and projecting into said inner telescopic cylinder and spaced therefrom, an open ended flexible air tube held within said piston cylinder and said inner telescopic cylinder, means forming a closure for one end of said air tube for clamping it to the closure cap of the outer telescopic cylinder, closure means for the other end of said air tube, said last named closure means comprising a pair of clamping plates, one of said plates having a projecting threaded lug, a nut coöperating therewith, and said inner telescopic cylinder having a pocket to receive said nut, substantially as shown and described.

14. The combination with an inner telescopic cylinder closed at one end and open at the other end, of an outer telescopic cylinder having one end open, a closure cap for the other end of said outer telescopic cylinder, said inner telescopic cylinder having a piston head, bumpers carried by said piston head, stops carried by said outer telescopic cylinder for coöperating with said bumpers, a piston cylinder secured to said closure cap and projecting into said inner telescopic cylinder and spaced therefrom, an open ended flexible air tube held within said piston cylinder, and said inner telescopic cylinder, means forming a closure for one end of said air tube for clamping it to the closure cap of the outer telescopic cylinder, closure means for the other end of said air tube, said last named closure means comprising a pair of clamping plates, one of said clamping plates having a projecting threaded lug, a nut coöperating therewith, said inner telescopic cylinder having a pocket to receive said nut, and means for admitting air into said flexible air tube, substantially as shown and described.

JAMES H. CLARK.

Witnesses:
  D. O. LAW,
  J. H. HANCOCK.